United States Patent
Cirot et al.

(10) Patent No.: US 6,211,920 B1
(45) Date of Patent: Apr. 3, 2001

(54) CIRCUIT FOR THE TREATMENT OF SYNCHRONIZATION SIGNALS

(75) Inventors: Eric Cirot, Fontaine; Nicolas Lebouleux, Grenoble, both of (FR)

(73) Assignee: SGS-Thomson Microelectronics S.A., Gentilly (FR)

( * ) Notice: Subject to any disclaimer, the term of this patent is extended or adjusted under 35 U.S.C. 154(b) by 0 days.

(21) Appl. No.: 08/764,357

(22) Filed: Dec. 12, 1996

(30) Foreign Application Priority Data

Dec. 18, 1995 (FR) .................................................. 95 15445

(51) Int. Cl.[7] .............................. H04N 5/08; H04N 5/10; H03L 7/00
(52) U.S. Cl. ......................... 348/533; 348/531; 348/533; 348/536; 348/542
(58) Field of Search ..................................... 348/531, 533, 348/534, 536, 540–548

(56) References Cited

U.S. PATENT DOCUMENTS

| 4,275,421 | * | 6/1981 | Louie et al. | 348/589 |
|---|---|---|---|---|
| 4,399,459 | * | 8/1983 | Mulvanny et al. | 348/523 |
| 4,636,860 | * | 1/1987 | Duijkers | 358/148 |
| 4,709,268 |   | 11/1987 | Akimoto et al. | 358/150 |
| 4,709,269 | * | 11/1987 | Ozaki | 455/296 |
| 4,843,469 | * | 6/1989 | Boyce | 348/546 |
| 4,945,413 | * | 7/1990 | Merval et al. | 348/531 |
| 4,974,081 | * | 11/1990 | Yokogawa | 358/148 |
| 5,142,170 |   | 8/1992 | Tkacik | 307/520 |
| 5,189,515 | * | 2/1993 | Chen | 348/535 |
| 5,663,688 | * | 9/1997 | Delmas et al. | 331/14 |

* cited by examiner

*Primary Examiner*—John Peng
*Assistant Examiner*—Paulos Natnael
(74) *Attorney, Agent, or Firm*—Wolf, Greenfield & Sacks, P.C.; James H. Morris; Theodore E. Galanthay

(57) ABSTRACT

A signal treatment circuit treats an input signal containing line sync pulses used for displaying data on a screen. The circuit contains a phase locked loop to control horizontal sweeping according to active edges of line sync pulses, and a filter circuit that filters equalizing signals from the input signals and provides a filtered input signal to the phase locked loop.

25 Claims, 10 Drawing Sheets

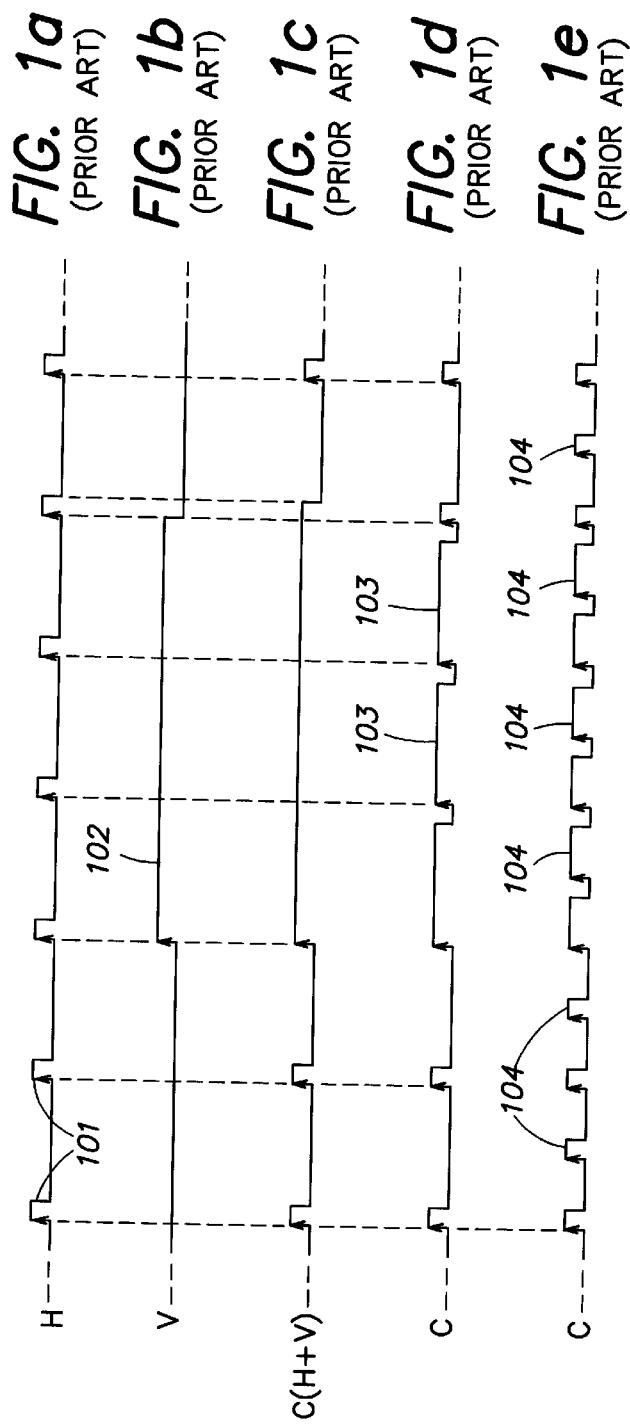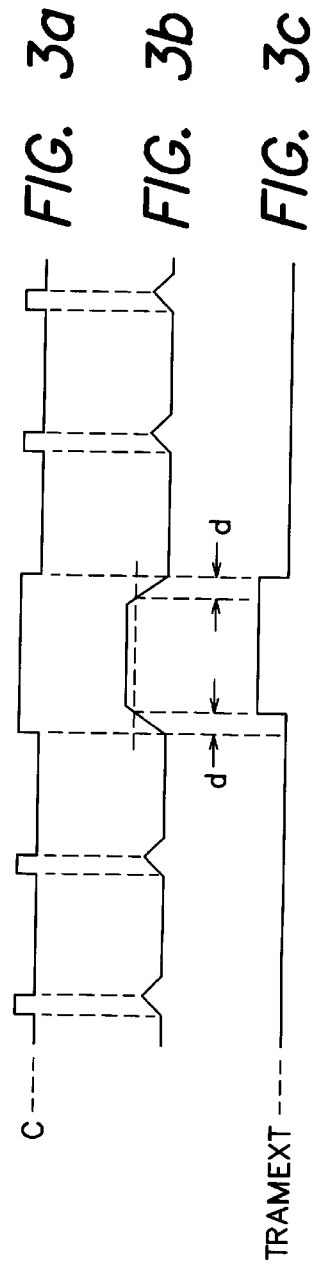

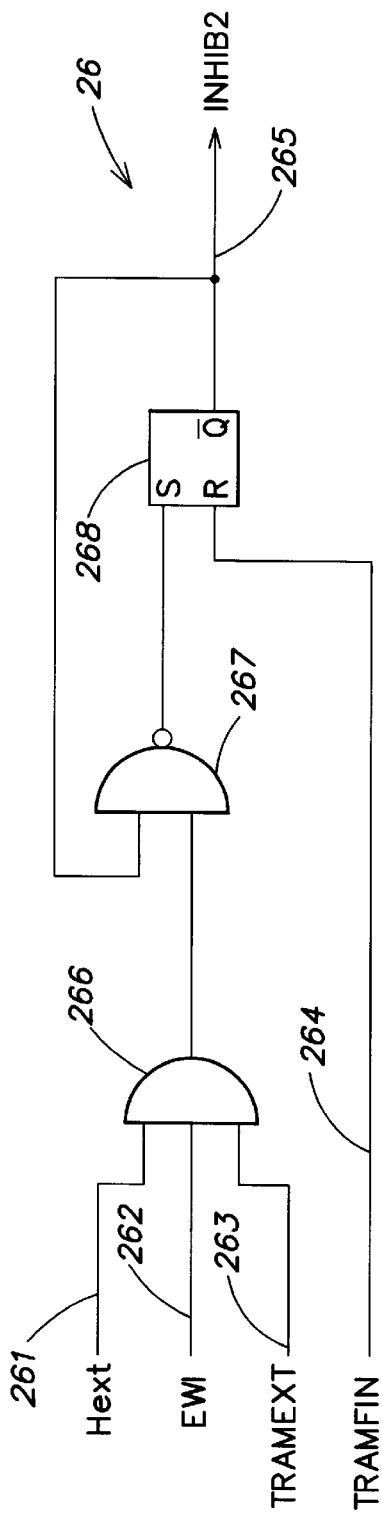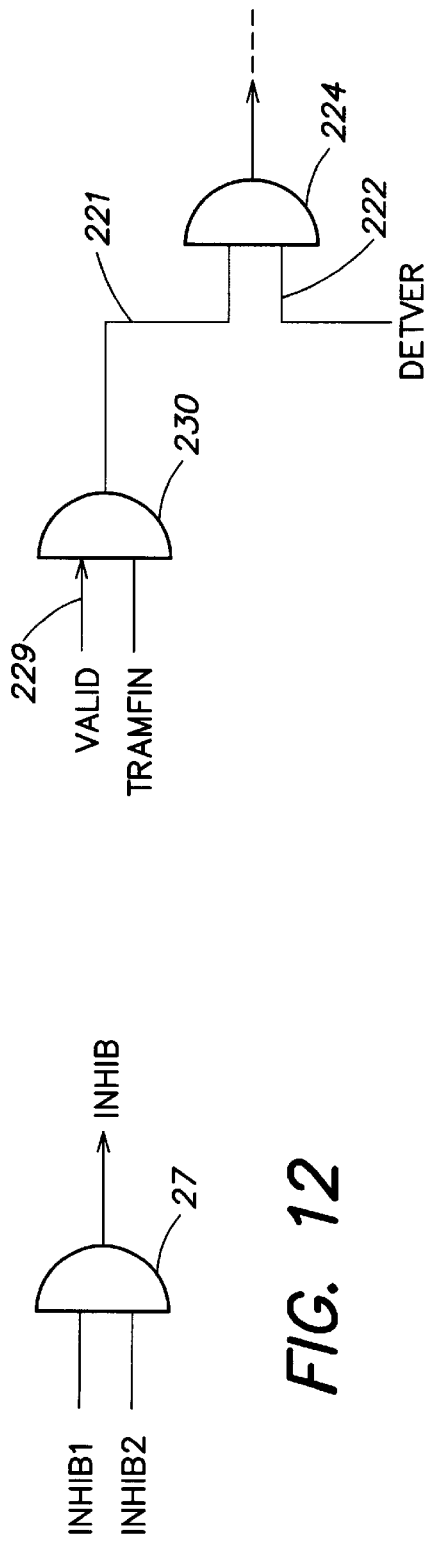
FIG. 11
FIG. 12
FIG. 13

CIRCUIT FOR THE TREATMENT OF SYNCHRONIZATION SIGNALS

BACKGROUND OF THE INVENTION

1. Field of the Invention

The invention relates to circuits for the treatment of line sync pulse signals used to display data on a screen. More particularly, the invention relates to a filter allowing the elimination of equalizing signals in a composite signal. An application to the field of monitors is described.

2. Discussion of the Related Art

To control the display of data on a monitor, and particularly to control the sweeping of an electron beam on a screen, synchronization signals are used. A frame is a collection of lines used to form an image on a screen of a monitor.

The synchronization signals are added to the useful signal, which represents the data to be displayed. Synchronization signals contain information allowing the determination of a start of a line (horizontal, or line sync) and the beginning of a frame (vertical, or frame sync). The synchronization signals are typically pulsed logic signals, largely defined by the polarity, frequency and duration of the pulses they contain. The polarity of the pulses may be positive or negative, according to which of the rising or falling edges are used. These signals are used by phase locked loops (PLLs).

FIGS. 1a and 1b illustrate such horizontal and vertical sync signals, H, V respectively. The signals represented are both of positive polarity and formed by pulses respectively labeled 101 and 102. The line sync signals have a higher frequency, the frame sync pulses have a longer duration, and the active edges (rising—edges for positive polarity) of frame sync and line sync pulses are in phase.

Line and frame sync signals are either transmitted separately, or in the form of a single composite signal, which includes simultaneously the line and frame synchronization information.

FIG. 1c shows such a composite signal, C(H+V). This composite signal corresponds to the logical OR of the signals H in FIG. 1a and V in FIG. 1b. A drawback of this type of composite signal is the absence of edges during the frame sync pulse.

FIG. 1d shows a composite signal C including serration signals 103 which may be inserted into the composite signal to reduce this problem. The serration signals produce active edges in the composite signal during frame sync pulses. The active edges added by the serration signals typically have the same frequency and phase as the active edges of the line sync signal in the composite signal.

Finally, FIG. 1e illustrates a composite signal C containing equalizing signals 104. For essentially historic reasons related to television, such equalizing signals may be inserted into the composite signal between the line sync pulses before and after the frame sync pulses, and between the serration signals during the frame sync pulses. They double the frequency of active edges when present. Typically, equalizing pulses appear five line sync pulses before a frame sync pulse, and they disappear five line sync pulses after the end of the frame sync pulse.

The presence of equalizing signals in a composite signal may disturb the functioning of a PLL which uses the composite signal to control the line sweep. There is a risk of locking the PLL onto a frequency double that-of the line sync pulses.

FIG. 2 schematically illustrates a PLL circuit used in monitors, in particular with regard to the line sync signals. The line sync signals are mainly treated by a PLL labeled PLL-H. This PLL includes a comparator 10, a charge pump 11, a capacitive filter 12, a voltage controlled oscillator (VCO) 13, and a phase adjustment means 14. The comparator 10 compares an input signal (line sync H or composite signal C) with a reference pulse signal Sref. According to the result of this comparison, the comparator controls charge pump 11. This pump 11 charges or discharges filter 12 so that a voltage Vref at the terminal of the filter 12 represents the result of the comparison. Oscillator 13 produces a triangular signal Vosch, the frequency of which is proportional to the voltage Vref. Signal Vosch is later transformed into pulse signal Sref by means 14. The position of edges in signal Sref is determined by a phase adjustment signal Sadj.

Comparator 10 is preferably a phase frequency comparator, which avoids locking PLL-H on a multiple of the line sync frequency. Once the input H/C and reference Sref sync signals are in phase and at the same frequency, voltage Vref stabilizes. A detection means 15 will generate a signal DETVER, the state of this signal indicating whether the PLL is in lock with the frequency and phase of the input signal.

Typically, an input interface 17a and an input/output interface 18 allow the input synchronization signals to be provided to PLL-H and to a frame sync signal treatment means 16. The input interface is for example a polarity detecting and signal cleaning interface, which provides positive polarity signals for use internally.

The interface 17a is connected to interface 18 by a circuit 17b, which is for example an integrator with integrated capacitor.

If the horizontal and vertical synchronization signals are separate, interface 17a supplies line sync signals H to PLL-H, and interface 18 provides frame sync signals V to means 16.

If the received signal is a composite signal, the input interface supplies the composite signal (rectified or not) to PLL-H and circuit 17b.

FIG. 3c shows a frame sync signal TRAMEXT, produced by circuit 17b, by extraction from the signal received by interface 17a, if this signal is a composite signal. Frame sync signal TRAMEXT is delayed by an amount d.

Referring to FIG. 3b, a classic technique for producing an extracted frame sync signal is to control the charging and discharging of the integrated capacitor of circuit 17b according to received pulses. Then, the voltage at the terminals of the integrated capacitor may be compared to a reference voltage, this reference voltage being chosen so as to not be reached when the charging period corresponds to the duration of a line sync pulse.

Circuit 17b typically includes an edge detector, such as a latch, to control a switching circuit included in interface 18 to supply signal TRAMEXT to means 16 and externally. Signal TRAMEXT may be used to inhibit PLL-H to avoid drifting of this PLL during reception of frame sync signals, if the sync signal is a composite signal.

The use of a phase/frequency comparator 10 may be preferable to the use of a simple phase detector, because locking PLL-H into a multiple frequency when only line sync pulses are present is then avoided. A problem is that this type of comparator is intolerant to an absence of pulses (for example, during a frame sync pulse without serration pulses) and to the presence of parasitic or unwanted pulses such as equalizing pulses.

SUMMARY OF THE INVENTION

An object of the invention is to provide a circuit avoiding the above mentioned problems. In order to achieve this, in one embodiment, a windowing operation is used, centered on the active edges of the received line sync pulses. In this way, drift which could be caused by equalizing pulses is eliminated.

An embodiment of the invention includes a circuit for the treatment of signals including line sync pulses used to display data on a screen, the circuit including a PLL to control the line sweep of the screen according to the active edges of the sync pulses. The circuit may also include means for producing a windowing filter to filter the signal received by the PLL when in an active state so that active edges of this received signal which are out of phase with active edges of the line sync pulses are eliminated.

In one embodiment, this windowing is combined with a windowing created by a frame sync signal treatment circuit, so that the windowing is effected around and during the frame synchronization pulses. This may avoid locking onto a multiple of the line sync frequency, which could happen with permanent windowing, in the case of an instantaneous frequency rise to a multiple of the previous frequency.

A permanent windowing leads to a risk of loss of phase lock of the PLL if the received sync pulses drift in frequency. A windowing limited in the time domain using equalization signals allows rapid adaptation to such a phase drift.

In one embodiment, the windowing signal is obtained by the combination of a signal representing the line sync pulses and a signal representing the frame sync pulses, in such a way that the windowing signal is activated at a time before the beginning of each frame sync pulse, and such that the windowing signal be deactivated after the end of each frame sync pulse.

BRIEF DESCRIPTION OF THE DRAWINGS

Other advantages and improvements according to the present invention will become apparent in the following description of certain non-limiting embodiments, with reference to the accompanying drawings, within which:

FIGS. 1a to 1e represent waveforms of known sync signals;

FIGS. 3a to 3c represent waveforms of a composite type signal and a frame sync signal extracted from the composite signal;

FIGS. 10, 11 and 12 represent circuits allowing inhibition of the PLL of a circuit according to an embodiment of the invention, FIG. 13 represents a modification which may be made to the circuit of FIG. 9.

DETAILED DESCRIPTION

Figure 2:
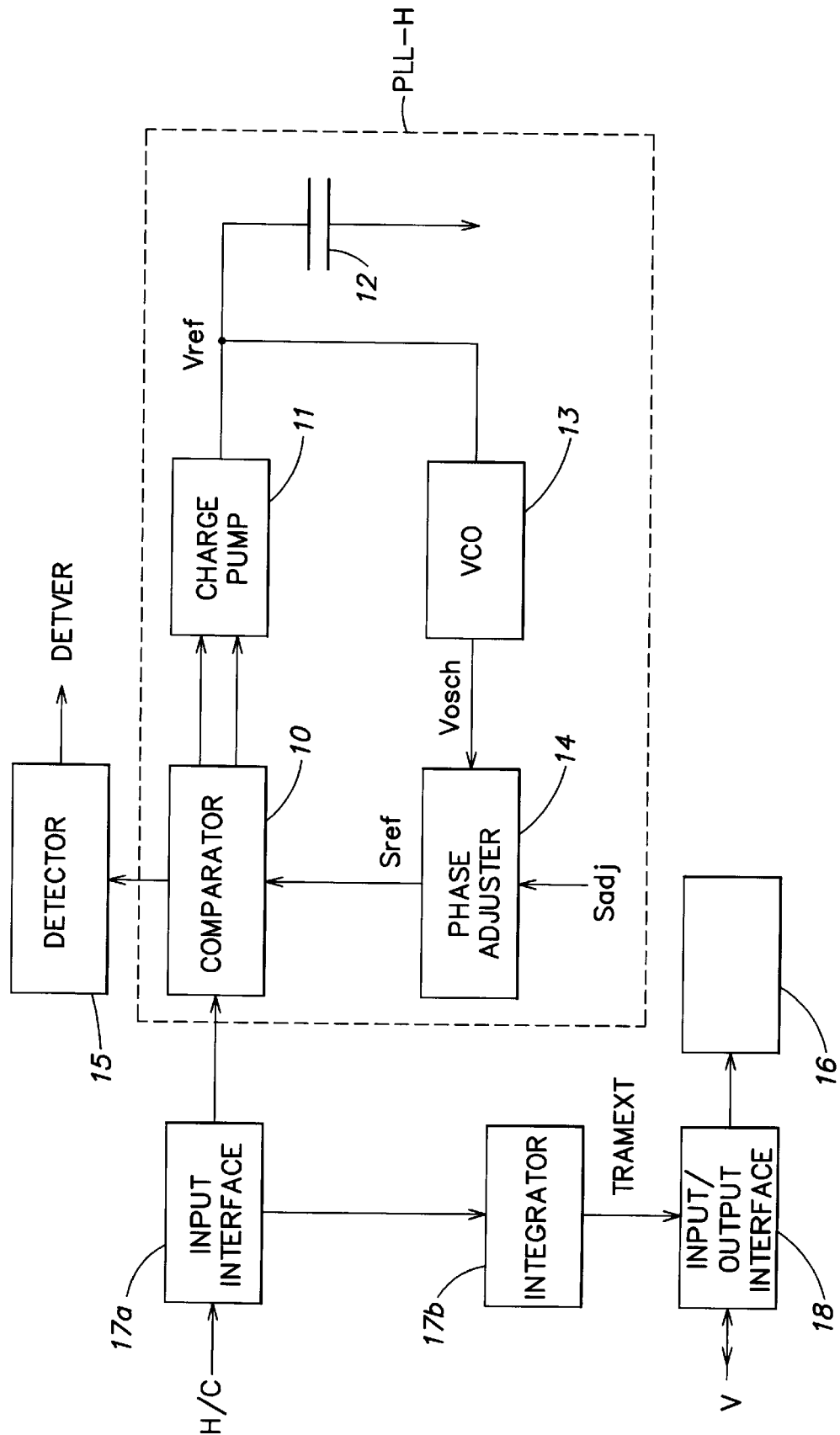
FIG. 2 schematically represents a known PLL.
Figure 4:
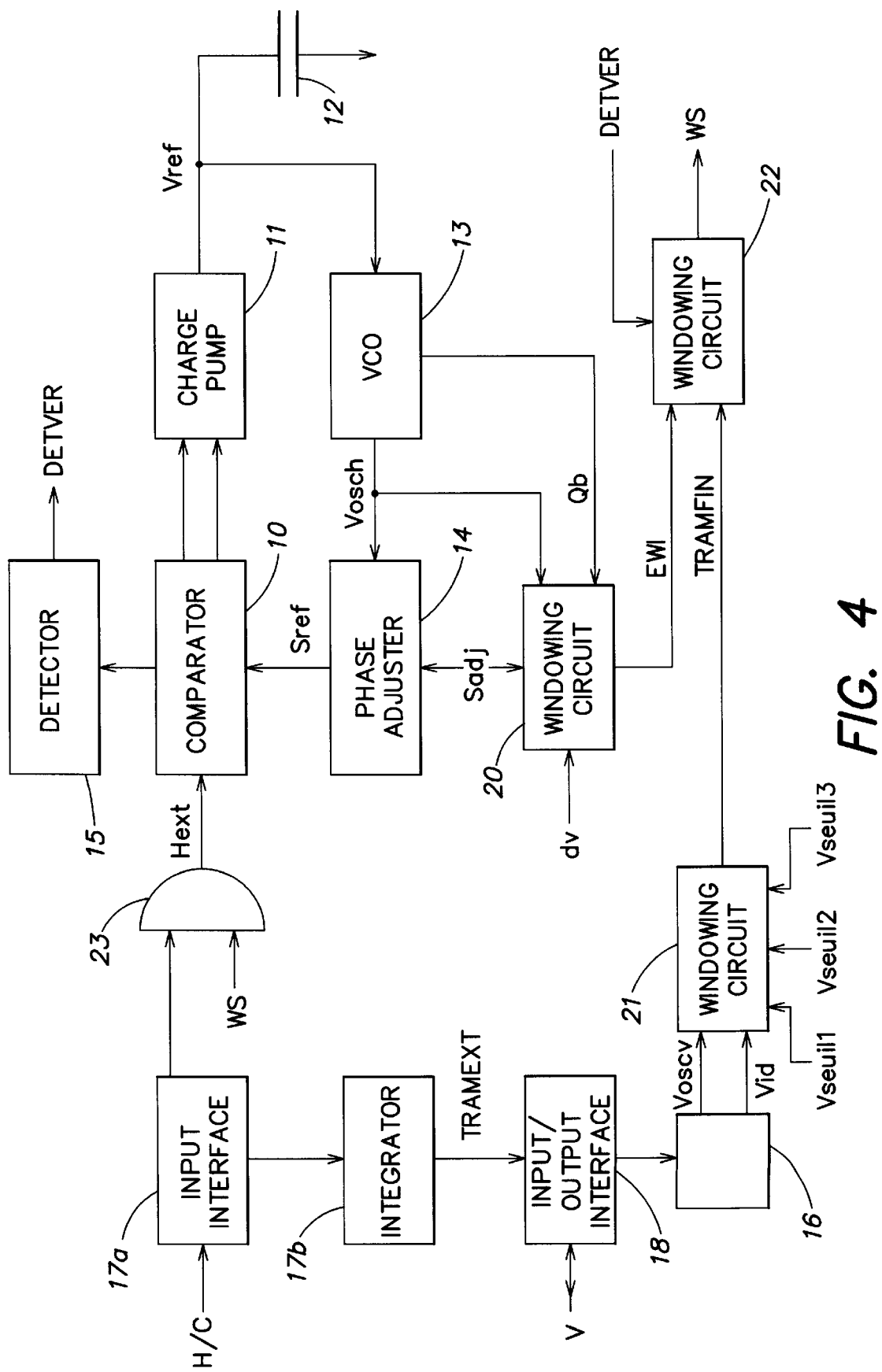
FIG. 4 schematically represents a circuit according to an embodiment of the invention.

FIG. 4 schematically illustrates a circuit according to an embodiment of the invention. Other than the features mentioned in FIG. 2, it includes a circuit 20 producing a windowing signal EWI from the signal Vosch produced by the oscillator 13 and the phase adjustment signal Sadj; a circuit 21 producing a windowing signal TRAMFIN from the frame synchronization signal treatment circuit, a circuit 22 allowing a windowing signal WS to be produced from signals EWI, TRAMFIN and DETVER; and an AND gate 23 allowing filtration of the received signal by PLL-H using signal WS to eliminate the equalizing pulses.

In the following description, it is assumed that the received signal is a positive polarity, composite signal. Should the original signal have a negative polarity, a simple logic inversion of this signal will produce a positive polarity signal.

Also, it is assumed that the logic signals are active at the high state, and inactive at the low state. By analogy, the rising edges are called active edges, and the falling edges are called inactive edges.

Figure 5:
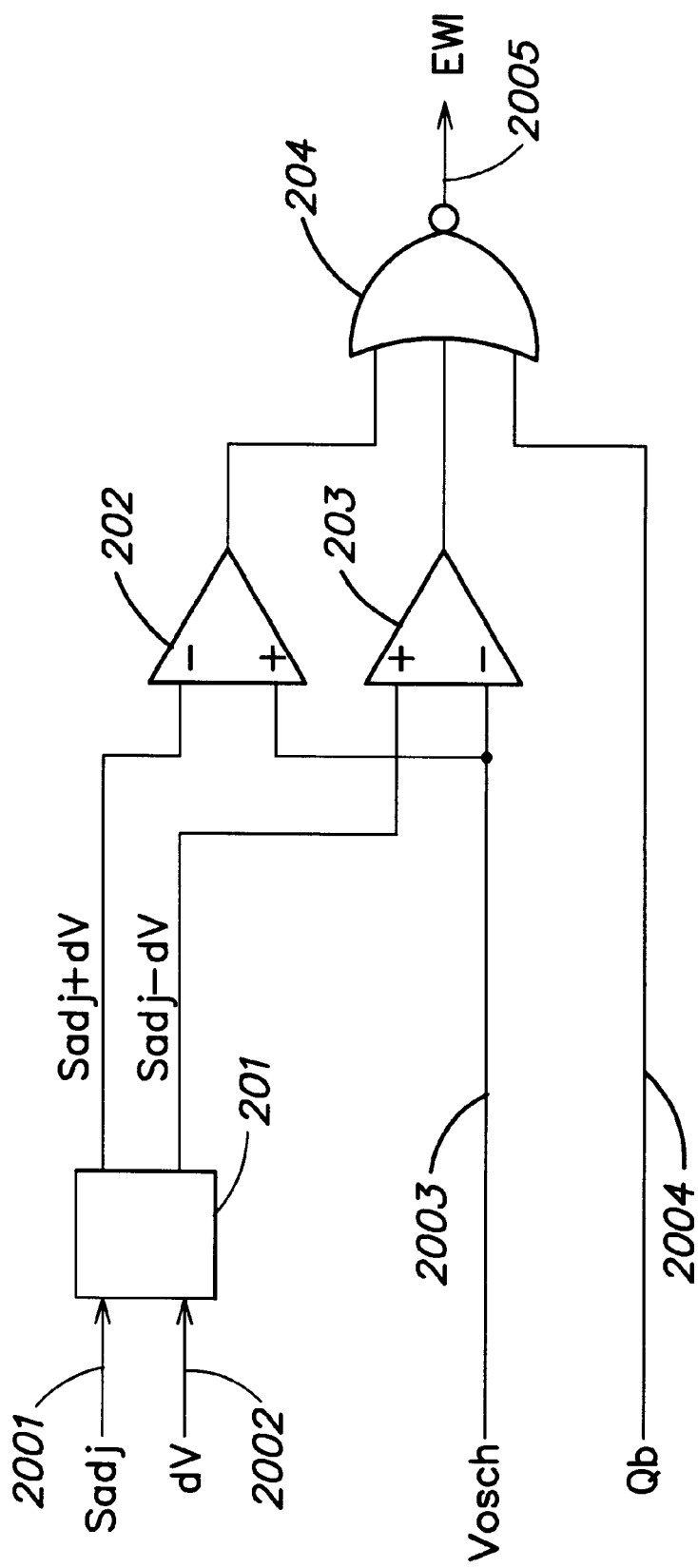
FIG. 5 represents circuitry included in an embodiment of the circuit of FIG. 4.

FIG. 5 illustrates an embodiment of circuit 20. This circuit has four inputs 2001, 2002, 2003, 2004, and an output 2005. Inputs 2001, 2002 receive signals Sadj and dV. These two signals are used to define signal EWI (illustrated in FIG. 6c). A voltage controlled voltage source 201 receives signals Sadj and dV, and produces two further voltages Sadj+dV, Sadj-dV. Input 2003 receives a triangular waveform Vosch (illustrated in FIG. 6b) from the oscillator 13. Input 2004 receives a signal Qb (illustrated in FIG. 6d) which is active during the falling slope of signal Vosch. Signal Qb may be produced by a capacitor discharge detector, the triangular waveform Vosch produced by the oscillator being typically produced by charging and discharging a capacitor.

A comparator 202 may be provided, and compares signal Vosch on its non-inverting input with signal Sadj+dV at its inverting input. A further comparator 203 is also provided, and compares signal Vosch on its inverting input with and with signal Sadj-dV at its non-inverting input. Circuit 20 may also include a NOR gate 204 having inputs receiving output signals of comparators 202 and 203, and signal Qb. Voltage Sadj used in the circuit of FIG. 5 is the signal used to detect the active edges of line sync pulses in the circuit 14. A pulse signal EWI is produced, whose frequency is identical to that of the line sync pulses, of positive polarity, and where the pulses are centered on the active edge of line sync pulses. The operation of circuit 20 will now be described with reference to FIGS. 6a to 6d.

Figure 6:
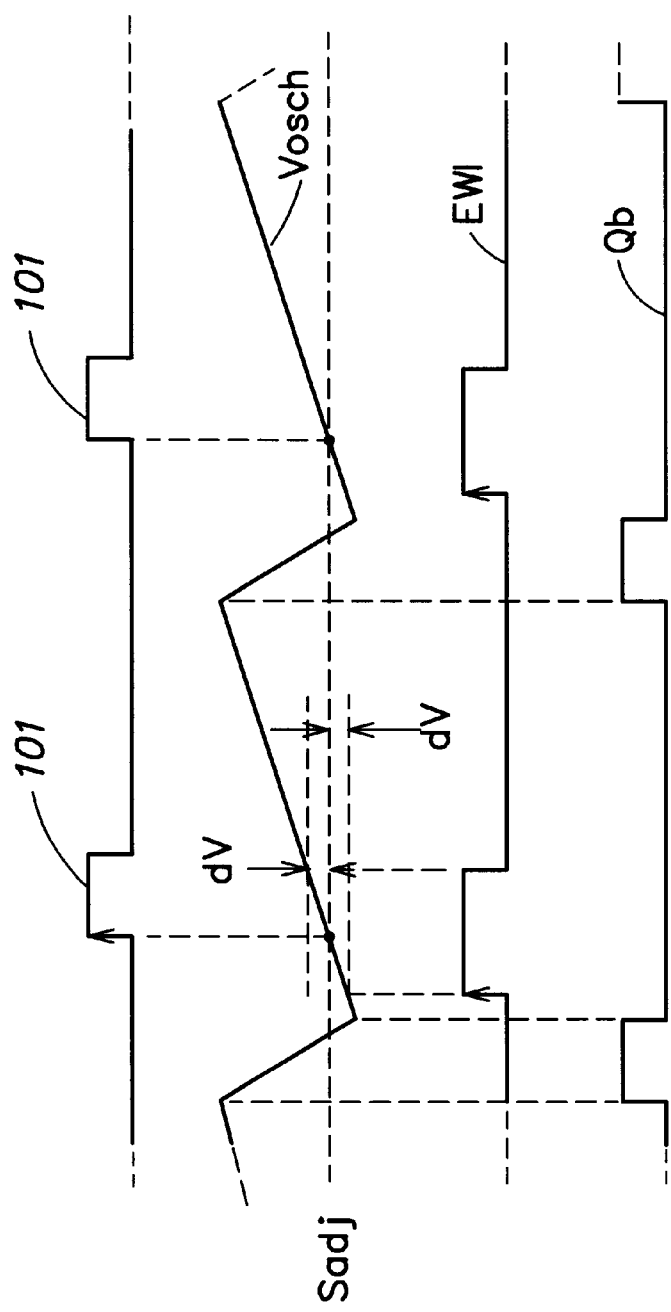
FIGS. 6a, 6b, 6c, and 6d represent waveforms of signals related to the creation of a windowing signal, as provided by an embodiment of the circuit of FIG. 5.

FIG. 6a illustrates a line sync signal, as also shown in FIG. 1a.

FIG. 6b shows the triangular waveform of Vosch, which includes a succession of positive ramps, where the signal voltage increases from a minimum value Vmin to a maximum value Vmax, and negative ramps, where the voltage descends from VVmax to Vmin. The positive ramps have a duration substantially equal to the period between successive active edges of the line sync signal. Thus, the edges of the sync signal correspond to points in time when the positive ramps reach a voltage Sadj, which lies between Vmin and Vmax.

FIG. 6c illustrates the windowing signal EWI. While the voltage of the ramp is less than Sadj-dV, comparator 203 produces an active signal. Signal EWI is therefore inactive.

When the positive ramp voltage reaches the value Sadj−dV, the output of comparator 203 becomes inactive. Signal EWI becomes active, and the signal produced by comparator 202, and Qb both remain inactive. Later, signal Voscv reaches the value Sadj+dV. The signal produced by comparator 202 becomes active. Signal EWI returns to its inactive state. Once the maximum voltage Vmax is reached, signal Voscv begins to decrease towards Vmin. During this time, signal Qb is active, which ensures that signal EWI remains inactive as Voscv decreases from Sadj+dV to Sadj−dV. Thus, pulses are produced on signal EWI, extending to either side of the active edges of line sync pulses.

Figure 7:
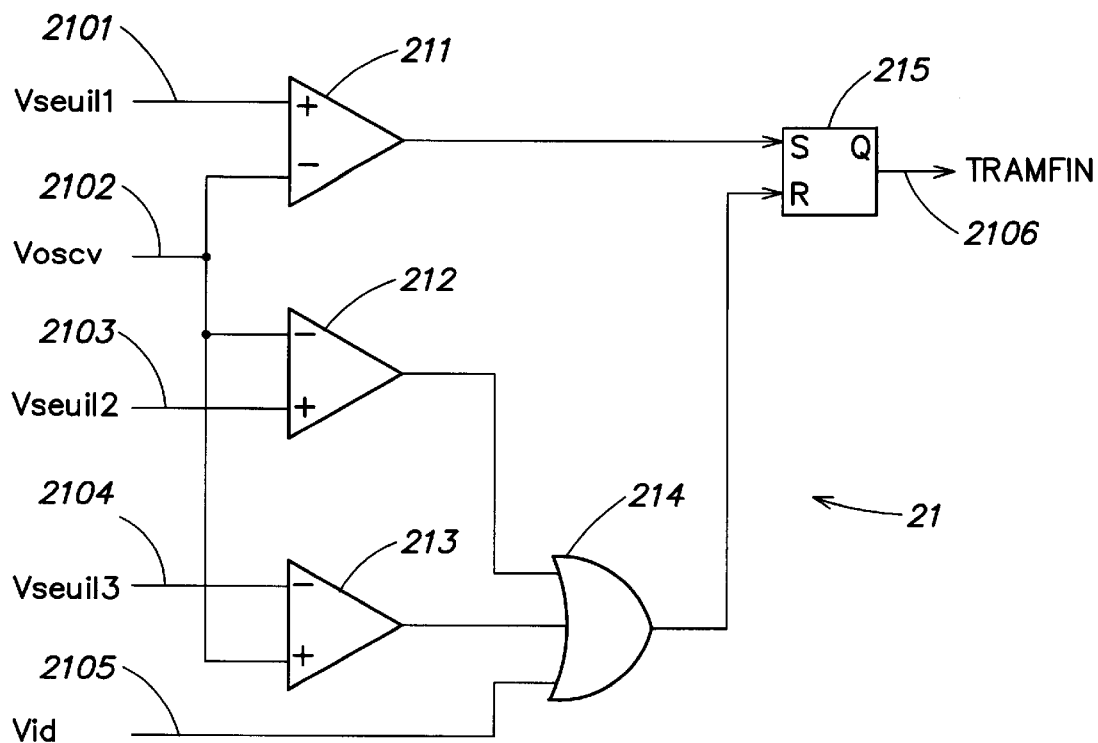
FIG. 7 represents circuitry included in an embodiment of the circuit of FIG. 4.

FIG. 7 illustrates an embodiment of circuit 21. This embodiment of circuit 21 includes five inputs and an output. Inputs 2101, 2102, 2103, 2104, 2105 receive voltages Vseuil1, Voscv, Vseuil2, Vseuil3 and Vid, respectively. An output 2106 provides a logic signal TRAMFIN. The values of voltages Vseuil1, Vseuil2, Vseuil3 are chosen to lie between voltages Vminv and Vref. Vseuil2 takes the lowest of the three values, and Vseuil1 takes the highest value.

Three comparators 211, 212, 213 are also shown in FIG. 7. Comparator 211 receives Vseuil1 on a non-inverting input and Voscv on an inverting input. Comparator 212 receives Voscv on a inverting input and Vseuil2 on a non-inverting input. Comparator 213 receives Voscv on a non-inverting input and Vseuil3 on an inverting input.

An OR logic gate 214 is depicted in FIG. 7, and receives as inputs the signals produced by comparators 212 and 213, in addition to signal Vid. A NAND-type RS latch 215 is provided, and receives the signal produced by gate 214 on reset input R, the signal produced by comparator 211 on set input S and the output Q is connected to circuit output 2106.

FIGS. 8a to 8f illustrate signals produced or received by an embodiment of circuit 21.

Figure 8A:
FIGS. 8a, 8b, 8c, 8d, 8e and 8f represent waveforms of signals related to the formation of a windowing signal by an embodiment of the circuit of FIG. 7.

FIG. 8a shows a frame sync pulse signal.

Figure 8B:
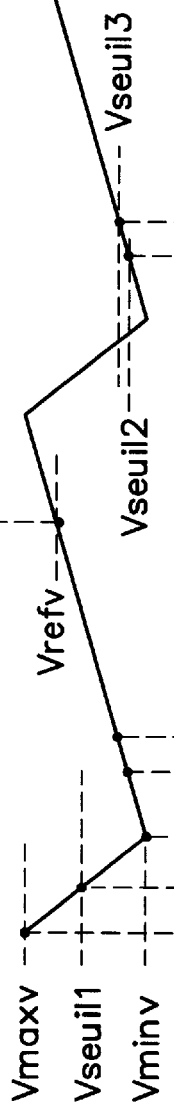
Figure 8C:
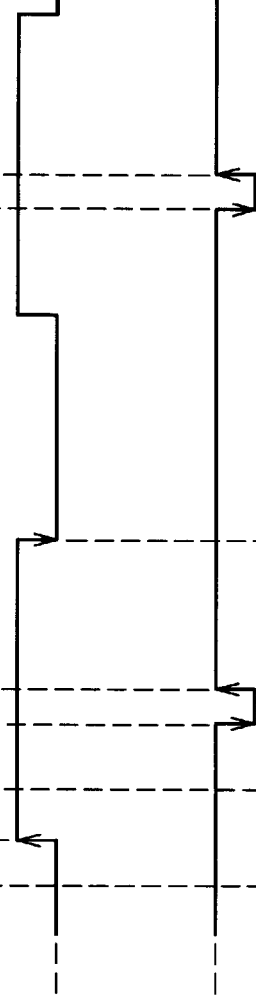
Figure 8D:
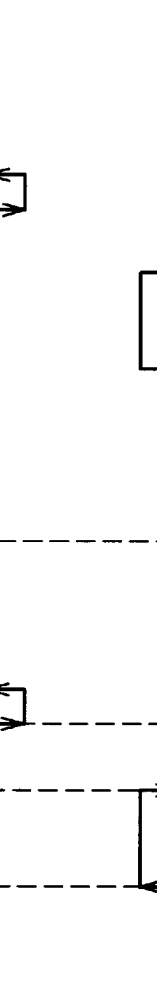

FIG. 8b shows signal Voscvw produced by the frame sync pulse treatment circuit 16. Signal Voscv includes a succession of positive ramps (voltage rising between a minimum voltage Vminv and a maximum voltage Vmaxv) and negative ramps (voltage decreasing from Vmaxv to Vminv). The active edges of the frame sync pulses generally occur at a time when the positive ramps reach a voltage Vrefv. The negative ramps have a fixed duration, for example 250 μs.

Figure 8E:
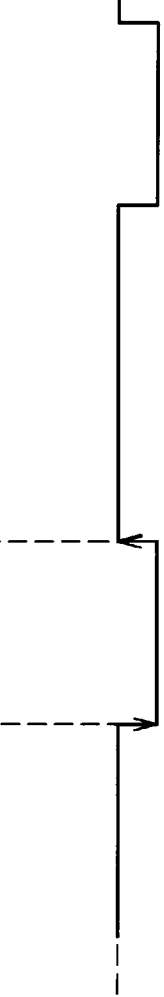
Figure 8F:

FIG. 8e shows signal Vid, which is active while Voscv is decreasing, and which is inactive otherwise.

The frame sync treatment circuit implemented in the TDA9103 product of SGS-THOMSON Microelectronics may be used, for example.

In one instance, the signal Voscv may be increasing, and may have a value greater than that of Vseuil3. In such an instance, the signal produced by comparator 213 is active, and so the signal (illustrated in FIG. 8d) produced by gate 214 is also active. When signal Voscv reaches value Vseuil1, signal produced by comparator 211 becomes inactive. Signal TRAMFIN (illustrated in FIG. 8f) then passes to the active state.

While signal Voscv is falling, signal Vid being active, the signal produced by gate 214 remains active. However, the signal produced by comparator 211 becomes inactive when Voscv reaches the value Vseuil1. Once signal Voscv has reached Vminv, it begins to increase again. Once it reaches the value of Vseuil2, the signal produced by gate 214 becomes inactive, which causes TRAMFIN to become inactive, until the Voscv again reaches the value Vseuil1. When value Vseuil3 is reached later, the signal produced by the comparator 213 becomes inactive, which causes the signal produced by gate 214 to become active. Latch 215 is ready to be set again.

A signal TRAMPIN is thus produced which is active during a period from the occurrence of an active edge of a frame sync pulse, and ends after the end of the corresponding frame sync pulse. Preferably, the values of Vseuil1, referenced to Vrefv, and Vseuil2, referenced to Vminv, may be chosen so that TRAMFIN is active in the time periods where equalization pulses may occur.

The frequency of line sync pulses is classically between 15 and 150 kHz, and threshold values may be chosen so that this whole frequency spectrum is covered. This is realized by choosing Vseuil1 so that Vrefv-Vseuil1 corresponds in time to a period of 333 μs (i.e. five periods of the lowest possible line sync frequency), and by choosing Vseuil2 so that the time period corresponding to Vseuil2-Vminv plus 250 μs is longer than the maximum duration of a line sync pulse (e.g. 700 μs) plus 333 μs, and calculated at the maximum frame sync pulse frequency.

Figure 9:
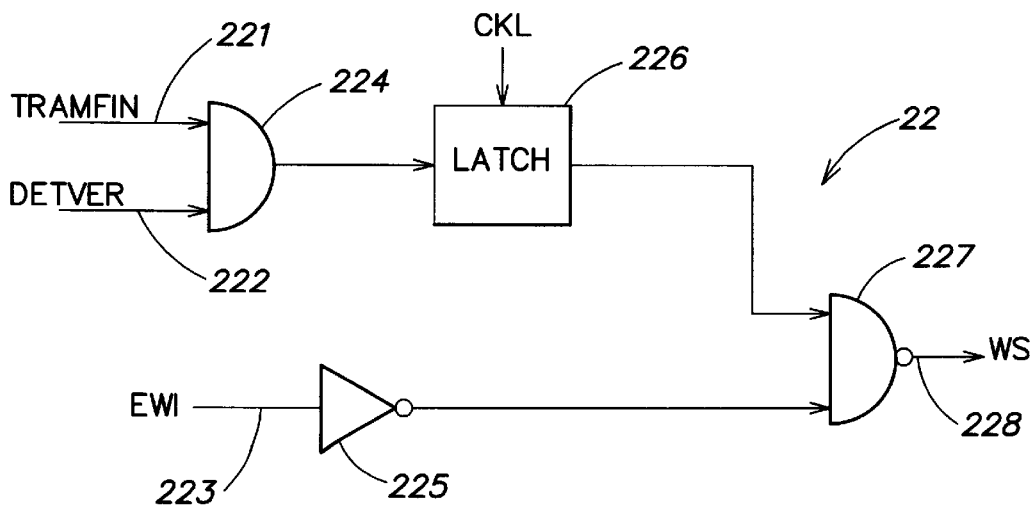
FIG. 9 represents circuitry included in an embodiment of the circuit of FIG. 4.

FIG. 9 illustrates an embodiment of circuit 22. This embodiment has inputs 221, 222, 223 receiving the signals TRAMFIN, DETVER and EWI respectively. This embodiment produces a signal WS at an output 228. This embodiment of circuit 22 also includes an AND gate 224 receiving signals TRAMFIN and DETVER on inputs, and having an output connected to an input of a D-type latch 226, which also receives a clock signal CKL. An inverter 225 may be provided to supply signal /EWI, the inverse of EWI. Also, the circuit may include a NAND gate 227 having inputs connected to /EWI and to the output of D-type latch 226.

If PLL-H is out of lock, signal DETVER is inactive. The output signals of gate 224 and latch 226 are therefore inactive. The output signal of gate 227 is thus active. The output of the AND gate 224 is therefore identical to the sync signal provided by interface 17. No windowing need be performed on this signal. This is justified by the fact that the PLL is searching for the phase and frequency of received line sync pulses.

If PLL-H is in lock, and the frame sync pulse is relatively far away with respect to time, DETVER is active, and TRAMFIN inactive. The outputs of gate 224 and latch 226 are therefore inactive. The output of gate 227 is active. This is identical to the previous case, where no windowing is performed on the sync signal provided by interface 17. As the frame sync signal is far off, only the line sync signals are present.

Finally, if PLL-H is in lock, at a time around the frame signal, DETVER is active, and TRAMFIN- becomes active. So, the output of gate 224 becomes active, and the output of the D-type latch 226 becomes active at the next clocking pulse on signal CKL. Therefore, signal WS may be identical to the EWI signal received by the circuit 22. Only the edges of line sync pulses and serration pulses are taken into consideration by PLL-H. The clock signal CKL is preferably valid on the active edge of the EWI signal, in order to avoid accidental start-up.

As described above, inhibition of the PLL during frame sync pulses is classically performed, to avoid a drift in the voltage Vref. If the serration pulses ate absent from the received signal, e.g. if the received signal is a composite signal such as H+V, it may be desirable to include such an inhibition function, to avoid creation of parasitic edges at the input of the PLL corresponding to edges of the EWI signal. If the state of the received signal is active at the same time as the windowing, the output of AND gate 23 will correspond to signal EWI. A phase difference will then be introduced into the loop, the active edges of EWI being in phase lead compared to the active edges of the line sync pulses.

Otherwise, when serration pulses are present, there is also a risk of producing parasitic pulses if the window EWI is too large, and the signal EWI becomes active before the received signal has returned to the inactive state.

In this way, an inhibition of the loop may be preferable in any case during the presence of frame sync pulses.

To achieve this, the charge pump may be disconnected from the filter, for example by placing a CMOS analog switch between these PLL elements. Such a switch could be controlled according to the extracted frame synchronization pulse, if a composite synchronization signal is used. If the synchronizations are differentiated, there is no need to inhibit PLL-H, and TRAMEXT is inactive.

Figure 10:
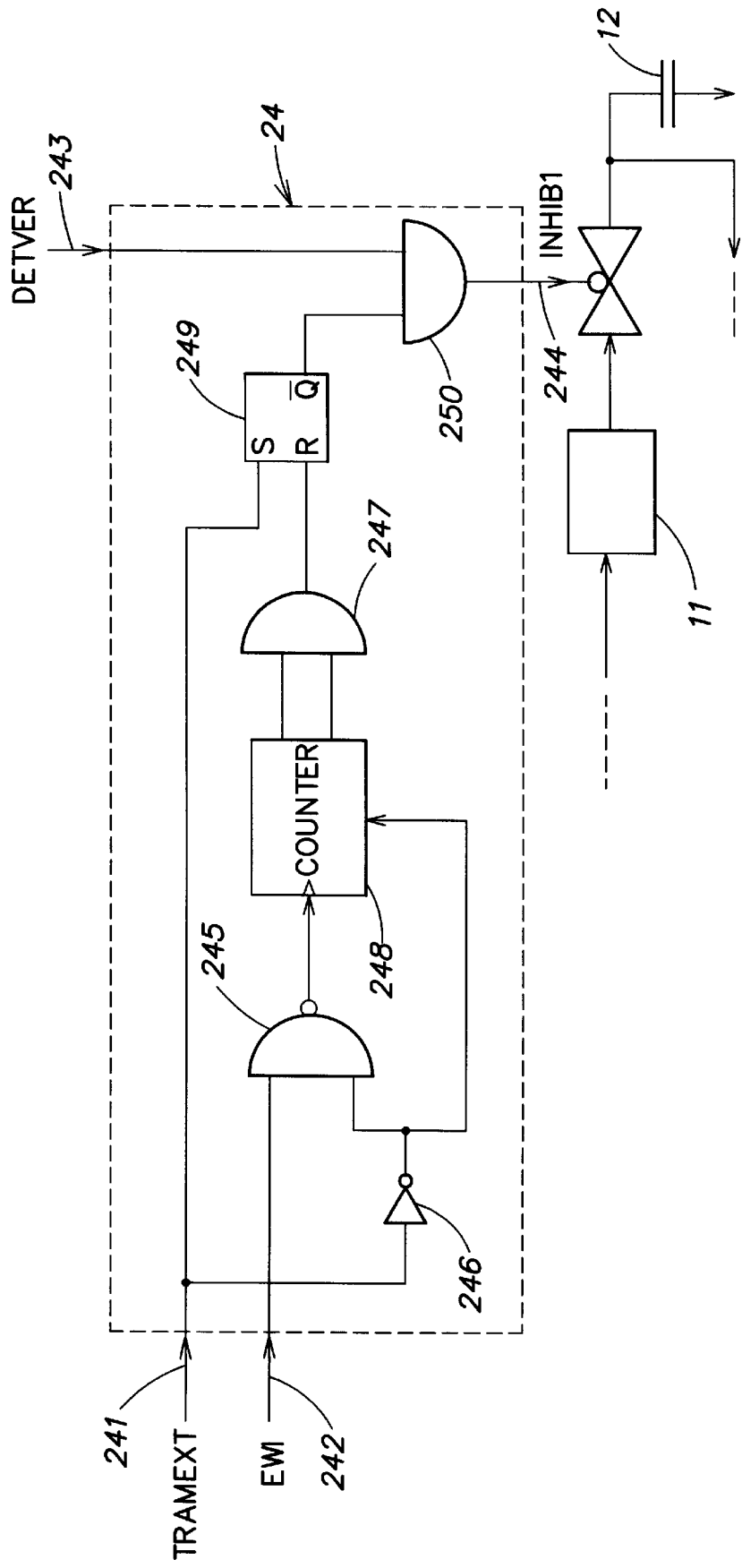

FIG. 10 shows an example of control circuit 24 which may be used to control PLL inhibition. This circuit comprises three inputs 241, 242, 243 receiving signals TRAMEXT, EWI, DETVER, respectively, and an output 244 providing a control signal INHIB1. Circuit 24 also includes a NAND gate 245, an inverter 246, an AND gate 247, a counter 248, a NOR type RS latch 249 and an AND gate 250

Gate 245 receives as inputs the signals EWI, and the inverse of TRAMEXT, as produced by inverter 246, the output of gate 245 is used to time the counter 248. In this example, the counting is performed on the falling edge of the output signal of gate 245. The output of inverter 246 is also used to operate the counter 248. Gate 247 is used as a comparator. Selected positive and inverse outputs of counter 248 are connected to inputs of gate 247, so that gate 247 produces an active signal when the counter reaches a certain desired value. The latch 249 receives signal TRAMEXT on its set input S, and the output of gate 247 on its reset input R. Gate 250 receives signal DETVER and the signal produced by the inverted output /Q of the latch as inputs, and has an output connected to the circuit output 244.

If the PLL is not in phase lock, signal DETVER is inactive. Therefore, signal INHIB1 is inactive. The pump is then connected to the filter, and the loop is in a phase and frequency search mode, on the signal received from interface 17.

If the PLL is in phase lock, signal DETVER is active. Therefore, the state of signal INHIB1 is determined by the state of the output of latch 249. An active edge of signal TRAMEXT causes the output of latch 249 to become active. Signal INHIB1 becomes active, which causes isolation of the filter from the charge pump. When the signal TRAMEXT becomes inactive again, counter 248 begins to count the descending edges of EWI. Once the counter reaches the desired value set by the connections of the inputs of gate 247, the reset input R of latch 249 becomes active. The output of latch 249 becomes inactive, and the inhibition signal INHIB1 becomes inactive. The described use of counter 248 allows a delay to be created between the end of the frame sync pulse and the end of PLL inhibition.

As an option, the two line sync pulses following the end of a frame sync pulse may be ignored.

It can be seen that if the line and frame sync signals are separate, the signal received by the PLL contains only line sync pulses. It is then unnecessary to inhibit the PLL as described above with reference to circuit 24.

Additionally, if a composite sync signal without serration pulses is used, no equalizing pulses will be present. It is then unnecessary to use signal WS to perform windowing on the input. This windowing could even be harmful if the previously described PLL inhibition is being used. If the filter capacitor leaks its charge, voltage Vref will reduce, which will cause the PLL oscillator to drift. Such drifting will introduce a time offset into signal EWI. It could then happen that the active edges of the line sync pulses appear when EWI is at the inactive state. The signal received by the comparator will then be permanently inactive.

Moreover, if serration pulses are present, and with relatively narrow EWI pulses, it may be desirable to not inhibit the PLL, as these serration pulses are of the same frequency and phase as the line sync pulses. Windowing may then be used to eliminate any equalizing pulses that may be present.

The above issues may be accounted for by generating an inhibition signal INHIB from previously described signal INHIB1, and another signal INHIB2, representing the presence or absence of serration pulses. In one embodiment, the PLL is only inhibited if serration pulses are not present.

FIG. 11 shows a circuit which may be used to produce signal INHIB2. Circuit 26 includes four inputs 261, 262, 263, 264 and an output 265. These four inputs receive signals Hext, EWI, TRAMEXT and TRAMFIN respectively, where Hext is the inverse of a signal Hext, provided at the output of AND gate 23 and received by the PLL. Input 262 receives signal EWI. Input 263 receives signal TRZMEXT. Input 264 receives signal TRAMFIN. Output 265 supplies signal INHIB2.

Circuit 26 includes a three-input AND gate 266. The inputs of circuit 26 are respectively connected to circuit inputs 261, 262, 263. The circuit also includes a two-input NAND gate 267, whose inputs are respectively connected to the output of gate 266 and to circuit output 265. A NAND RS latch 268 is included in the circuit, whose set input S is connected to the output of gate 267, and whose reset input R is connected to the circuit input 264. An inverting output / Q of this latch is also connected to the circuit output 265.

FIG. 12 shows that signal INHIB may be produced by an AND gate 27 receiving INHIB1 and INHIB2 as input signals.

Initially, INHIB2 is active. If there are no serration pulses, signal /Hext remains inactive during reception of a frame sync pulse, so that the output of gate 266 is high (active). Thus, INHIB2 remains unchanged and signal INHIB is identical to INHIB1, and in this situation the PLL is inhibited. If serration pulses are present, signal /Hext becomes active while EWI is active. A pulse is produced at the output of gate 266. This causes signal INHIB2 to become inactive, and INHIB is then inactive. There is no inhibition of the PLL. Gate 267 allows the set signal S applied to latch 268 to become active again, to avoid problems with the latch when a falling edge of TRAMFIN arrives.

Considering the above, circuit 26 may usefully be modified by adding a validation signal.

FIG. 13 shows circuitry which may be added to circuit 22 to receive a VALID signal on input 229. An AND gate 230 receives signals TRAMFIN and VALID, and the output of this gate is connected to the input 221 described in reference to FIG. 9. TRAMFIN may be propagated by AND gate 230 only when VALID is active, and an inactive output is produced by AND gate 230 to input 221 if VALID is inactive.

Figure 14:
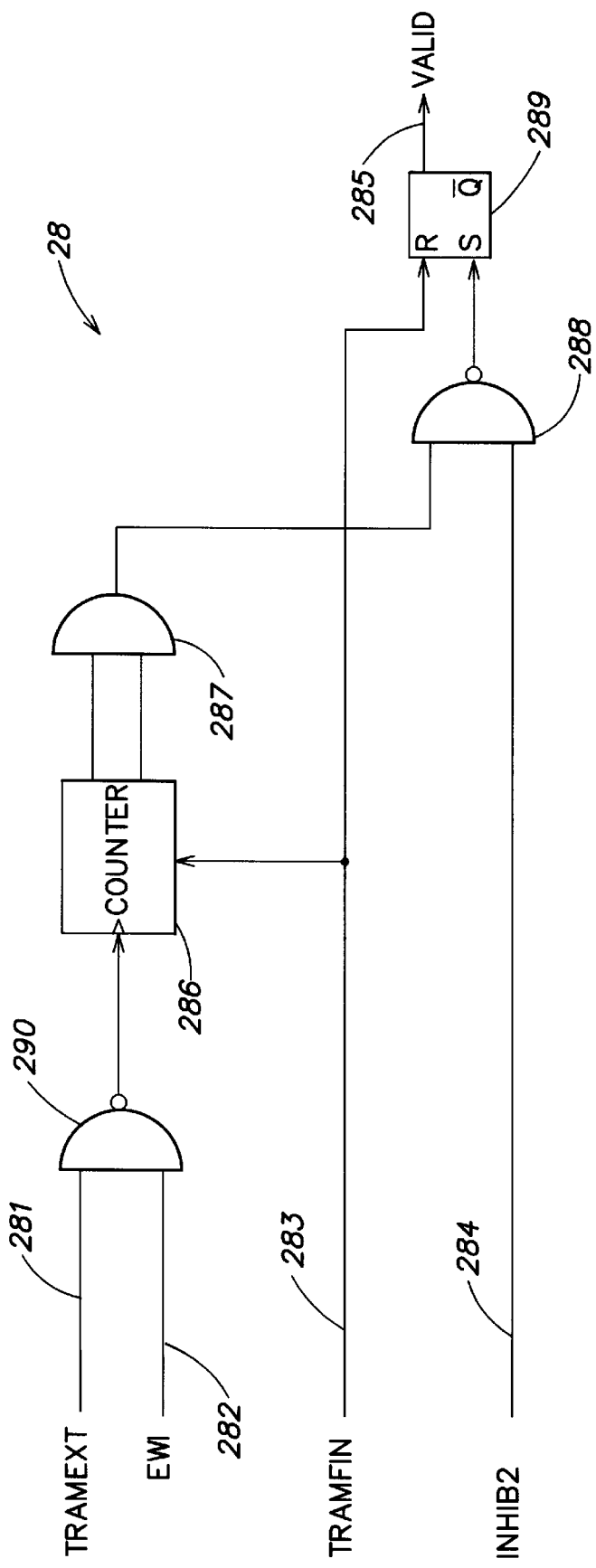
FIG. 14 represents a circuit allowing the production of a signal used by the circuit of FIG. 13.

FIG. 14 shows circuitry 28 which may be used to generate the signal VALID. The circuitry has four inputs 281, 282, 283, 284, receiving signals TRAMEXT, EWI, TRAMFIN, and INHIB2 respectively. The VALID signal is provided at an output 285. A NAND gate 290 has inputs connected to circuit inputs 281 and 282, and provides a signal to an edge sensitive clock input of a counter 286. Circuit input 283 is connected to a start input of this counter. Selected positive and inverse outputs of the counter 286 are supplied to an AND gate 287, which supplies an active signal when a certain, predetermined count is reached. A NAND gate 288 has an input connected to circuit input 284, and a further input connected to an output of AND gate 287. An RS latch 289 is also provided, having a reset input R connected to circuit input 283, a set input S connected to an output of gate 288, and an inverting output /Q supplying the signal VALID to circuit output 285.

If serration pulses are present, signal INHIB2 becomes inactive while TRAMEXT is active. The output of gate 288 will thus remain active, and so also will VALID. The windowing operation previously described is operative.

If there are no serration pulses, signal INHIB2 remains active while TRAMEXT is active. When the counter 286 reaches the predetermined value, the output of gate 287 becomes active, the output of gate 288 becomes inactive, and this sets latch 289, causing signal VALID to become inactive. The windowing operation is inhibited.

The invention may typically be used in a monitor, classically comprising a screen and horizontal and vertical deflection devices. The deflection is controlled using signals Voscv and Vosch, suitably amplified, and a flyback signal additionally used in controlling horizontal deflection.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A signal treatment circuit for treating an input signal containing line sync pulses used for displaying data on a screen, the signal treatment circuit comprising:
    a filter circuit having an input that receives the input signal, the filter circuit modifying the input signal to remove active edges within the input signal that are out of phase with active edges of the line sync pulses to create an intermediate signal, the filter circuit having an output that provides the intermediate signal;
    a phase locked loop having an input, coupled to the output of the filter circuit, that receives the intermediate signal, and an output that provides a control signal to control horizontal sweeping of the data on the screen, in response to the active edges of the line sync pulses of the intermediate signal; and
    further comprising a window circuit that provides a window signal;
    wherein the filter circuit has a second input that receives the window signal, the filter circuit modifying the input signal in response to the window signal;
    wherein the window circuit has a first input that receives a line sync signal, a second input that receives a frame sync signal, the window circuit logically combining the line sync signal and the frame sync signal to create the window signal so that the window signal is activated at a time prior to a beginning of each frame sync signal and is deactivated at a time after an end of each frame sync signal.

2. The signal treatment circuit of claim 1, further comprising a controller having an output that activates the window circuit to provide the window signal when the input signal includes a composite signal containing serration pulses, the output of the controller further deactivating the window circuit when the input signal does not include a composite signal containing serration pulses.

3. The signal treatment circuit of claim 1, wherein:
    the input signal contains a frame synchronization pulse; and
    the signal treatment circuit further comprises an inhibitor having an output that inhibits the phase locked loop during a time in which the phase locked loop receives the frame synchronization pulse.

4. The signal treatment circuit of claim 3, further comprising an inhibit controller having an output that prevents the inhibitor from inhibiting the phase locked loop when the input signal contains serration pulses.

5. The signal treatment circuit of claim 1, in combination with the screen and a deflection apparatus coupled to the screen and the signal treatment circuit, to form a display device.

6. The signal treatment circuit of claim 1, wherein the active edges within the input signal that are out of phase with active edges of the line sync pulses include a plurality of equalizing pulses.

7. A signal treatment circuit for treating an input signal containing line sync pulses used for displaying data on a screen, the signal treatment circuit comprising:
    a filter circuit having an input that receives the input signal, the filter circuit modifying the input signal to remove active edges within the input signal that are out of phase with active edges of the line sync pulses to create an intermediate signal, the filter circuit having an output that provides the intermediate signal;
    a phase locked loop having an input, coupled to the output of the filter circuit, that receives the intermediate signal, and an output that provides a control signal to control horizontal sweeping of the data on the screen, in response to the active edges of the line sync pulses of the intermediate signal;
    further comprising a window circuit that provides a window signal;
    wherein the filter circuit has a second input that receives the window signal, the filter circuit modifying the input signal in response to the window signal;
    wherein the input signal includes a frame sync pulse; and
    the filter circuit removes active edges within the input signal that are out of phase with active edges of the line sync pulses from a time prior to a beginning of the frame sync pulse until a time after an end of the frame sync pulse.

8. A circuit for treating an input signal containing line sync pulses and frame sync pulses used for displaying data on a screen, the circuit comprising:
    a filter circuit having an input that receives the input signal, the filter circuit modifying the input signal to remove active edges within the input signal from a time prior to a beginning of each of the frame sync pulse until a time after an end of each of the frame sync pulses to create an intermediate signal, the filter circuit having an output that provides the intermediate signal;

a phase locked loop having an input, coupled to the output of the filter circuit, that receives the intermediate signal, and an output that provides a control signal to control horizontal sweeping of the data on the screen, in response to active edges of the line sync pulses of the intermediate signal;

further comprising a window circuit that provides a window signal;

wherein the filter circuit has a second input that receives the window signal, the filter circuit modifying the input signal in response to the window signal; and wherein the window circuit has a first input that receives a line sync signal derived from the input signal and a second input that receives a frame sync signal derived from the input signal, the window circuit logically combining the line sync signal and the frame sync signal to create the window signal.

9. The circuit of claim 8, further comprising a controller having an output that activates the window circuit to provide the window signal when the input signal includes a composite signal containing serration pulses, the output of the controller further deactivating the window circuit when the input signal does not include a composite signal containing serration pulses.

10. The circuit of claim 8, further comprising an inhibitor having an output that inhibits the phase locked loop during a time in which the phase locked loop receives the frame synchronization pulse.

11. The circuit of claim 10, further comprising an inhibit controller having an output that prevents the inhibitor from inhibiting the phase locked loop when the input signal contains serration pulses.

12. The circuit of claim 8, in combination with the screen and a deflection apparatus coupled to the screen and the signal treatment circuit, to form a display device.

13. A circuit for treating an input signal containing line sync pulses and frame sync pulses used for displaying data on a screen, the circuit comprising:

a filter circuit having an input that receives the input signal, the filter circuit modifying the input signal to remove active edges within the input signal from a time prior to a beginning of each of the frame sync pulse until a time after an end of each of the frame sync pulses to create an intermediate signal, the filter circuit having an output that provides the intermediate signal;

a phase locked loop having an input, coupled to the output of the filter circuit, that receives the intermediate signal, and an output that provides a control signal to control horizontal sweeping of the data on the screen, in response to active edges of the line sync pulses of the intermediate signal;

further comprising a window circuit that provides a window signal;

wherein the filter circuit has a second input that receives the window signal, the filter circuit modifying the input signal in response to the window signal; and wherein the time prior to a begiṇiing of each of the frame sync pulse through the time after an end of each of the frame sync pulses to includes a time in which a plurality of equalizing pulses in the input signal are received by the circuit.

14. A method for processing an input synchronization signal containing a series of line synchronization pulses and additional pulses, the method comprising the steps of:

filtering the input synchronization signal to remove at least some of the additional pulses, to create an intermediate signal; and locking onto a phase of the intermediate signal to generate a control signal indicative of the series of line synchronization pulses; wherein the input synchronization signal further contains a frame synchronization pulse; the step of filtering includes removing active edges from the input signal from a time prior to a beginning of the frame synchronization pulse until a time after an end of the frame synchronization pulse; and wherein the step of filtering includes removing at least some of the additional pulses which are out of phase with a phase of the line synchronization pulses.

15. The method of claim 14, wherein:

the additional pulses include equalizing pulses; and the step of filtering includes filtering the equalizing pulses from the input signal.

16. The method of claim 14, wherein the step of filtering includes filtering the input signal when the input signal is a composite signal.

17. The method of claim 14, wherein the step of filtering includes filtering the input signal when the input signal does not include serration pulses.

18. The method of claim 17, further comprising a step of detecting whether the input signal includes serration pulses.

19. A method for processing an input synchronization signal containing a series of line synchronization pulses and additional pulses, the method comprising the steps of:

filtering the input synchronization signal to remove at least some of the additional pulses, to create an intermediate signal;

locking onto a phase of the intermediate signal to generate a control signal indicative of the series of line synchronization pulses; wherein the input synchronization signal further contains a frame synchronization pulse;

the step of filtering includes removing active edges from the input signal from a time prior to a beginning of the frame synchronization pulse until a time after an end of the frame synchronization pulse;

wherein the step of filtering includes filtering the input signal when the input signal is a composite signal; and further comprising a step of detecting whether the input signal is a composite signal.

20. An apparatus for processing an input synchronization signal containing a series of line synchronization pulses and additional pulses, the apparatus comprising:

means for filtering the input synchronization signal to remove at least some of the additional pulses, to create an intermediate signal; and means for locking onto a phase of the intermediate signal to generate a control signal indicative of the series of line synchronization pulses; wherein the input synchronization signal further contains a frame synchronization pulse;

the means for filtering includes means for removing active edges from the input signal from a time prior to a beginning of the frame synchronization pulse until a time after an end of the frame synchronization pulse; and wherein the means for filtering includes means for removing at least some of the additional pulses which are out of phase with a phase of the line synchronization pulses.

21. The apparatus of claim 20, wherein:

the additional pulses include equalizing pulses; and the means for filtering includes means for filtering the equalizing pulses from the input signal.

22. The apparatus of claim 20, wherein the means for filtering includes means for filtering the input signal when the input signal is a composite signal.

23. The apparatus of claim 20, wherein the means for filtering includes means for filtering the input signal when the input signal does not include serration pulses.

24. The apparatus of claim 23, comprising means for detecting whether the input signal includes serration pulses.

25. An apparatus for processing an input synchronization signal containing a series of line synchronization pulses and additional pulses, the apparatus comprising:

means for filtering the input synchronization signal to remove at least some of the additional pulses, to create an intermediate signal;

means for locking onto a phase of the intermediate signal to generate a control signal indicative of the series of line synchronization pulses; wherein the input synchronization signal further contains a frame synchronization pulse;

the means for filtering includes means for removing active edges from the input signal from a time prior to a beginning of the frame synchronization pulse until a time after an end of the frame synchronization pulse;

wherein the means for filtering includes means for filtering the input signal when the input signal is a composite signal; and further comprising means for detecting whether the input signal is a composite signal.

\* \* \* \* \*